UNITED STATES PATENT OFFICE.

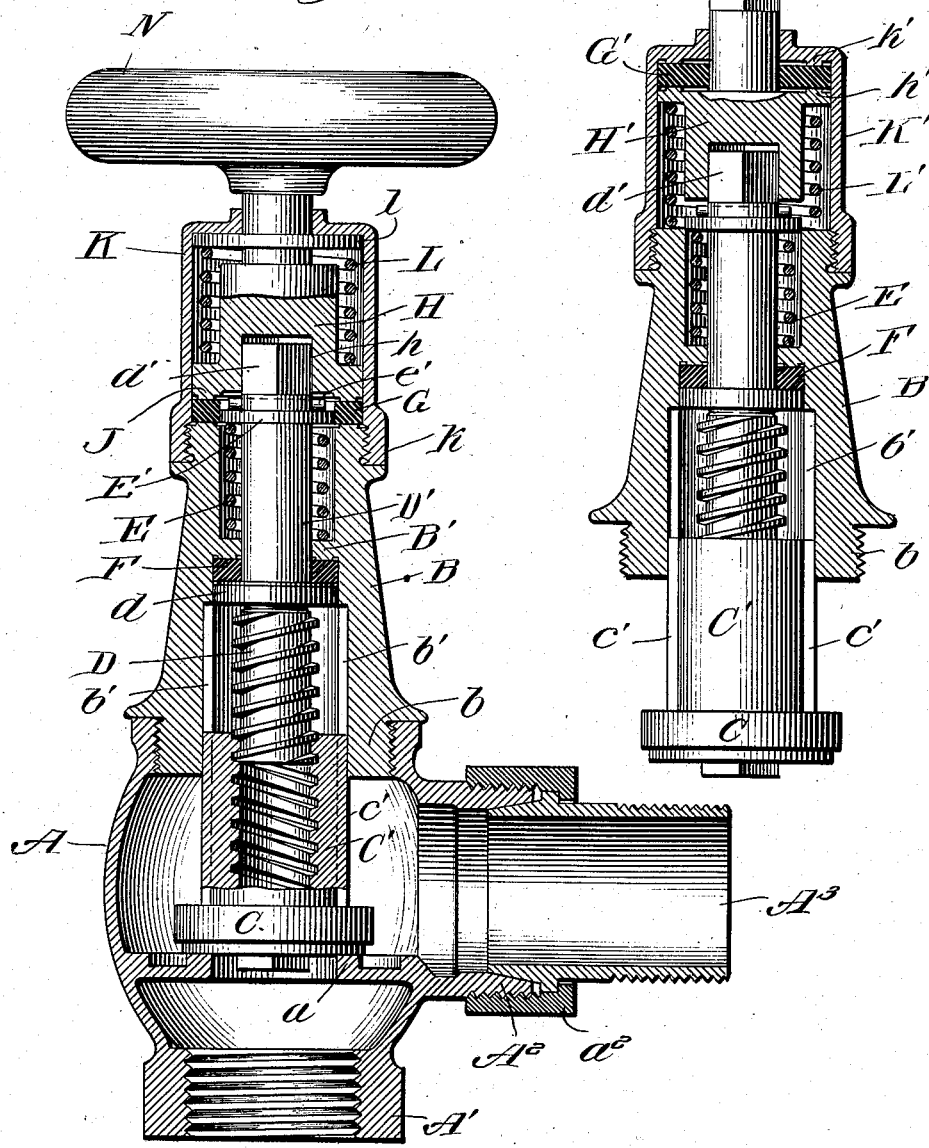

GEORGE M. BARD, OF CHICAGO, ILLINOIS, ASSIGNOR TO NORWALL MANUFACTURING COMPANY, OF CHICAGO, ILLINOIS.

RADIATOR-VALVE.

933,225. Specification of Letters Patent. Patented Sept. 7, 1909.

Application filed April 28, 1906. Serial No. 314,131.

*To all whom it may concern:*

Be it known that I, GEORGE M. BARD, a citizen of the United States, residing at Chicago, county of Cook, State of Illinois, have invented a certain new and useful Improvement in Radiator-Valves, and declare the following to be a full, clear, and exact description of the same, such as will enable others skilled in the art to which it pertains to make and use the same, reference being had to the accompanying drawings, which form a part of this specification.

My invention relates in general to valves for controlling the flow of fluid through a conduit, and more particularly to valves used in heating systems intermediate of the radiators and pipes for supplying the heating medium.

It is customary in steam and hot water heating systems to provide hand-operated valves for controlling the flow of the heating medium to the radiator. Much difficulty is experienced in preventing leakage of the heating medium from the valve casings into which the valve operating stems extend. Trouble is also caused by the relatively rotating parts sticking when heated. It is usual to provide packing of some sort around the valve stems which is however objectionable owing to the fact that the materials best adapted for producing a tight joint deteriorate from contact with the steam and packings formed of other materials become loose with usage. The leakage is increased by the wear imposed upon the packing by the rotation of the valve stem relatively to the casing in opening and closing the valve.

The primary object of my invention is to provide a valve for controlling the flow of fluid through a conduit the relatively rotating parts of which will not stick when heated, and which will be at all times proof against leakage.

A further object of my invention is to provide a valve which may be quickly opened and closed, and which will be simple in construction, inexpensive in manufacture, and efficient in use.

The embodiment of my invention herein disclosed may be generally described as consisting of a valve casing, a valve seat within said casing, a valve coöperating with said seat, a two-part rotary valve stem extending within said casing but axially immovable with respect thereto, means for connecting the two parts of said stem to permit axial movement but to prevent relative rotary movement, a flange projecting around each part of said stem, circular seats in said casing coöperating with said flanges, means for forcing said flanges against the coöperating seats, and operative connections whereby a rotation of the stem will move the valve toward and away from its seat.

My invention will be more fully described hereinafter with reference to the accompanying drawings in which the same is illustrated as embodied in two convenient and practical forms and in which,—

Figure 1 is a central sectional view and Fig. 2 a central sectional view showing a modification.

Similar reference characters are used to designate similar parts in the two figures of the drawing.

Reference letter A designates a valve casing adapted to be interposed between two sections of a conduit or between a radiator and a conduit for supplying a heating medium thereto.

A' indicates an interiorly screw-threaded coupling formed integrally with the valve casing which is adapted to be united to the conduit through which the heating medium flows.

A² indicates an exteriorly screw-threaded coupling formed integrally with the casing and adapted to be connected with the radiator by suitable means, such for instance as a short pipe section A³ having a rib $a^3$ thereon which is engaged by a ring $a^2$ the latter being in screw-threaded engagement with the coupling A².

B indicates a bonnet or tubular extension of the valve casing provided with an exteriorly screw-threaded lower end $b$ which is received within the upper end of the valve casing A.

C indicates a valve located within the casing and coöperating with a valve seat $a$ therein.

C' indicates a tubular shank rigidly connected to the valve and provided with an interior screw-thread into which extends the lower screw-threaded end of the section D of a two-part valve stem. The valve shank C' is provided with vertical ribs $c'$ which engage vertical grooves $b'$ formed in the inner surface of the lower part of the bonnet B.

The section D of the valve stem is provided with a laterally projecting circular flange $d$ above the screw-thread which underlies an inwardly projecting circular seat B' formed integrally with the bonnet B. A ring F is interposed between the flange $d$ and the seat B' to form a tight joint to prevent leakage. The ring F is made of suitable material which will not be detrimentally affected by the heat and which will withstand the wear incident to the rotation of the valve stem relatively to the casing.

The portion of the lower section D of the valve stem which projects above the seat B' is surrounded by a spring E bearing at its lower end upon the seat and at its upper end against a washer E' underlying a pin $e'$ extending through the valve stem. The tension of the spring E consequently tends to lift the lower section of the valve stem upwardly thereby forcing the flange $d$ against the ring F and the ring F against the under surface of the seat B'.

The upper end $d'$ of the lower section D of the valve stem is rectangular in cross section and is received within a rectangular socket $h$ formed in the lower end of the upper section H of the valve stem. The lower end of the section H of the valve stem is provided with a laterally projecting flange J which overlies the upper end of the bonnet B.

G designates a ring interposed between the upper end of the bonnet and the flange J, such ring being made of suitable material which will withstand heat and wear.

K indicates a cap within which the upper section H of the valve stem is located and which is provided with an interior screw-thread at its lower end engaging an exterior screw thread around the upper end of the bonnet B. A spring L is located within the cap K around the upper section of the valve stem and rests at its lower end against the flange J and at its upper end against a washer $l$ located around the valve stem and resting against the inner surface of the top of the cap. The tension of the spring L serves to force the flange J against the ring G and to force the ring G into close contact with the seat formed in the upper end of the bonnet. The end of the valve stem which projects above the cap K is provided with any suitable means for imparting rotary motion to the valve stem, such for instance as a hand wheel N.

The operation of the embodiment of my invention above described is as follows: Rotary motion applied to the hand wheel N is communicated to the upper section of the valve stem and to the lower section of the valve stem so that the screw thread is rotated relatively to the screw thread in the socket of the valve shank C'. As the shank C' is prevented from rotating relatively to the casing by means of the engaged ribs $c'$ and grooves $b'$, the shank is lifted and with it the valve away from the seat $a$. By rotating the hand wheel N in an opposite direction the valve may be moved into contact with its seat. The loose yielding connection between the two sections of the valve stem prevents any slight oscillatory movement imparted to the hand wheel N from being transmitted to the lower section of the valve stem so that the flange $d$ will not be rocked away from the ring F. Any danger of leakage around the ring F from such cause is consequently avoided. Should, however, any leakage occur past the ring F from any cause whatever further leakage will be prevented by the ring G. It is thus evident that leakage around the valve stem from the casing to the exterior thereof is doubly guarded against.

In Fig. 2 I have illustrated a modification of my invention in which a second ring G' is interposed between the under surface $k'$ of the top of the cap K' and a flange $h'$ on the upper section H' of the valve stem. A spring L' is interposed between the top of the bonnet B and the under surface of the flange $h'$. The embodiment of my invention illustrated in Fig. 2 is in all other respects than those mentioned identical with the invention as above described in connection with Fig. 1. In this embodiment of my invention leakage through the bonnet around the valve stem is prevented by the ring F while leakage around the valve stem through the cap is prevented by the ring G'

My improved valve is adapted not only to prevent leakage from systems containing a heating medium under pressure above the atmosphere, but is also adapted for use in connection with vacuum heating systems to prevent the admission of air through the valve casing to the system. The inner ring F serves principally to prevent the leakage from a pressure system while the ring G primarily serves to prevent the admission of air to a vacuum system. It will be understood, however, that both rings coöperate to prevent leakage either of pressure to the atmosphere from the valve casing, or to prevent the leakage of air to the valve casing.

From the foregoing description it will be observed that I have invented an improved valve in which leakage will be doubly guarded against and which will not be detrimentally affected either by heat or by wear incident to usage. It will also be observed in my improved valve the fluid pressure tight joint within the casing will not be affected by any tilting to which the upper portion of the valve stem may be subjected when the valve is opened or closed.

Having now fully described my invention, what I claim as new and desire to secure by Letters Patent is:

1. The combination with a valve casing, of a valve within said casing, a two-part valve stem projecting out of said casing, there being a loose connection between the members of the stem at a point within the casing, said casing having annular seats surrounding the stem, a flange on one stem member at a point between the valve and the innermost seat and forming an imperforate cover coöperating with said latter seat, a flange on the other stem member in operative relation to the other seat and forming an imperforate cover coöperating with that seat, and means for forcing said flanges against said seats.

2. The combination with a valve casing, of a valve within said casing, a two-part valve stem projecting out of said casing, there being a loose connection between the members of the stem at a point within the casing, said casing having an inwardly and an outwardly facing annular seat surrounding the stem, a flange on the inner stem member at a point between the valve and the inwardly facing seat, a flange on the outer stem member beyond the outermost seat, and means for forcing said latter flange inwardly against said outermost seat, each of said flanges forming with its associated stem member an imperforate cover coöperating with its respective seat in the casing.

3. The combination with a valve casing, of a valve within said casing, an imperforate valve stem projecting out of said casing, a yielding connection in said valve stem dividing it into two portions at a point within the casing, and transverse bearings between each of said portions of the stem and the casing, said bearings being so arranged that the innermost bearing is tightened by outward pressure while the outermost bearing is tightened by inward pressure.

4. The combination with a valve casing, of a valve within said casing, a two-part stem projecting out of said casing, a loose connection between the members of said stem at a point within the casing, inwardly and outwardly facing annular seats on said casing, an annular flange associated with the outer stem member and forming therewith an imperforate cover coöperating with the outwardly facing seat, an annular flange on the inner stem member forming therewith an imperforate cover coöperating with said inner seat, a spring for forcing the outer flange inwardly and a second spring for forcing the inner flange outwardly.

5. The combination with a valve casing including a bonnet and a cap, a valve within said casing, a valve stem projecting out of said casing, a valve stem projecting out of said casing, said cap surrounding said valve stem and secured to the bonnet, a loose connection between the portions of the valve stem within the casing, transverse inwardly and outwardly facing annular seats surrounding said valve stem, a flange on the outer stem member forming therewith an imperforate cover engaging with the outwardly facing seat, a flange on the inner stem member forming therewith an imperforate cover coöperating with the inwardly facing seat, and springs for forcing said flanges against said seats.

6. The combination with a valve casing including a bonnet and a cap, a valve within said casing, a valve stem operatively associated with said valve and extending through said bonnet, said cap surrounding said valve stem and adjustably secured to said bonnet, there being a loose connection in said valve stem at a point within the casing, annular seats surrounding said valve stem, an annular flange on each of the stem portions produced by said yielding connection and forming with said stem portions imperforate covers coöperating with said seats, and springs surrounding the valve stem and acting to force said flanges against said seats.

7. The combination with a valve casing, of a valve within said casing, a stem member connected to said valve, transverse annular seats within said casing surrounding said stem member and facing inwardly and outwardly respectively, a seat-engaging part movably connected with said stem member and coöperating with said outwardly facing seat, a flange on said stem member underlying said inwardly facing seat, a spring surrounding said stem member for drawing said flange toward said inwardly facing seat, and means on said stem for engaging the outer end of the spring to maintain it under compression, said latter means contained wholly within the casing so as to be inaccessible when the parts are in position.

8. The combination with a valve casing, of a valve within said casing, a stem member connected to said valve, transverse annular seats within said casing surrounding said stem member and facing inwardly and outwardly respectively, a seat-engaging part movably connected with said stem member and coöperating with said outwardly facing seat, a flange on said stem member underlying said inwardly facing seat, a spring surrounding said stem member for drawing said flange toward said inwardly facing seat, and a handle upon said seat-engaging part for operating the stem and the valve, said spring being arranged wholly within the casing so as to be inaccessible when the parts are in position.

9. A valve comprising a casing, a rotatable stem member therein having a seat-engaging part movably connected therewith, a handle extending into the casing and loosely connected to said stem member at a point within said casing, a composition disk associated with said stem member, two engaging parts for said disk one on the stem member and the other on the casing, a spring for forcing said two parts together, and means on said stem member for engaging with the outer end of the spring to maintain the spring under compression, said latter means being contained wholly within the casing so as to be inaccessible when the parts are in position.

In testimony whereof, I sign this specification in the presence of two witnesses.

GEORGE M. BARD.

Witnesses:
GEO. L. WILKINSON,
C. A. MULLEN.